United States Patent
Franzon et al.

(10) Patent No.: US 7,505,010 B2
(45) Date of Patent: Mar. 17, 2009

(54) ANTENNA CONTROL SYSTEM (75) Inventors: Bo Franzon, Bro (SE); Torbjörn Olsson, Åkersberga (SE)

(73) Assignee: Powerwave Technologies Sweden AB, Taby (SE)

( * ) Notice: Subject to any disclaimer, the term of this patent is extended or adjusted under 35 U.S.C. 154(b) by 104 days.

(21) Appl. No.: 11/791,421

(22) PCT Filed: Nov. 25, 2005

(86) PCT No.: PCT/SE2005/001776

§ 371 (c)(1),
(2), (4) Date: May 23, 2007

(87) PCT Pub. No.: WO2006/057612

PCT Pub. Date: Jun. 1, 2006

(65) Prior Publication Data

US 2007/0290935 A1 Dec. 20, 2007

(30) Foreign Application Priority Data

Nov. 26, 2004 (SE) .................................... 0402880

(51) Int. Cl.
*H01Q 3/00* (2006.01)
(52) U.S. Cl. ....................... 343/757; 343/754; 343/853; 342/372; 342/371
(58) Field of Classification Search ................. 343/757, 343/765, 766, 754, 853; 342/368, 371, 372
See application file for complete search history.

(56) References Cited

U.S. PATENT DOCUMENTS

| 3,277,481 A | 10/1966 | Robin et al. |
| 4,841,309 A * | 6/1989 | Burr ........................... 343/766 |
| 5,801,600 A | 9/1998 | Butland et al. |
| 6,198,458 B1 | 3/2001 | Heinz et al. |
| 6,590,546 B2 * | 7/2003 | Heinz et al. .................. 343/853 |

(Continued)

FOREIGN PATENT DOCUMENTS

JP H5-37222 2/1993

(Continued)

OTHER PUBLICATIONS

PCT International Search Report and Written Opinion for International Application No. PCT/SE 2005/001776 dated Jan. 3, 2006.

(Continued)

*Primary Examiner*—Hoang V Nguyen
(74) *Attorney, Agent, or Firm*—Myers, Dawes, Andras & Sherman, LLP (57) ABSTRACT

An antenna control system for setting the tilt angle of a main lobe of an antenna, in particular of an antenna constituting part of a base station in a mobile cellular communication system, said antenna comprising a plurality of antenna elements and phase shifting means for varying the phase of at least one signal being fed to said antenna elements, wherein adjustment of said phase of said signal is achieved by actuating an operating element, and wherein actuation of said operating element is achieved by operating an operating element actuator. The operating element actuator is coupled to the operating element of the phase shifting means by means of a force field coupling.

29 Claims, 7 Drawing Sheets

U.S. PATENT DOCUMENTS

| | | | |
|---|---|---|---|
| 6,600,457 B2* | 7/2003 | Heinz et al. | 343/853 |
| 2005/0085267 A1* | 4/2005 | Lemson et al. | 455/562.1 |
| 2006/0066494 A1 | 3/2006 | Trejtnar et al. | |

FOREIGN PATENT DOCUMENTS

| | | |
|---|---|---|
| JP | H5-121915 | 5/1993 |
| WO | WO 96/37922 | 11/1996 |
| WO | WO 0235651 A1 | 5/2002 |
| WO | WO 02061877 A2 | 8/2002 |
| WO | WO 2004/077611 A1 | 9/2004 |

OTHER PUBLICATIONS

Peter Strickland, Ph.D., "Microstrip Base Station Antennas for Cellular Communications", IEEE Journal, 1991, pp. 166-171.

* cited by examiner

ANTENNA CONTROL SYSTEM

This application is a 371 of PCT/SE05/01776 dated Nov. 25, 2005.

FIELD OF THE INVENTION

The present invention relates to antenna control system for setting the tilt angle of an antenna. More particularly, the system is of the kind defined in the preamble of claim 1.

The present invention also relates to an operating element actuator as defined in the preamble of claim 21, an operating element of the kind defined in the preamble of claim 25, and an antenna as defined in the preamble of claim 29.

BACKGROUND OF THE INVENTION AND RELATED PRIOR ART

Today, mobile telephone systems usually are cellular systems, in which each cell in the system has at least one corresponding associated base station with at least one antenna for transmitting and receiving signals to/from e.g. user terminals of the system.

The base station antennas are designed such that the inclinational angle of the beam radiated from such an antenna generally is deflected downwardly with an angle relative to a horizontal plane in order to define a specific cell size. However, due to e.g. geographical topology and/or presence of buildings, the cell size in the system may vary, and so may the mounting height of the base station antennas. Therefore, the deflection angle, hereinafter referred to as downtilt angle, of the various antennas in the system must be set to different angles depending on the size of the particular cell in which the antenna is located, as well as the mounting location of the antenna.

The cell size, and thus also the downtilt angle, may also vary with varying kinds of cellular mobile telephone systems since different systems use different frequency ranges, and depending on the specific frequency range that is used, cell sizes has to be varied to provide a sufficient communication capacity.

The base station antennas are usually provided with a plurality of radiating elements arranged on a vertical row, and to vary the downtilt angle, a phase angle difference between the radiating elements is imposed on a common signal fed to the radiating elements, wherein the phase angle differences between any two elements is the same. This results in a composite beam from the plurality of radiating elements that will always have a wave front substantially in the form of a straight line. The inclination angle may further be adjustable, for example by means of phase shifters, by adjusting the phase angle difference between the radiating elements.

Today, adjustment of the phase shifters often requires that adjustment is carried out manually directly on or at the antenna, usually by maneuvering an operating element such as knob or a rod. Maneuvering the knob or rod may then actuate phase shifting means to relatively change the phase angle difference between signals fed to the radiating elements and thus the downtilt angle. There also exists, however, systems where the downtilt angle may be controlled from a remote location, e.g. by sending commands from a central operation and maintenance centre to control electronics associated with operating element actuating means, such that the control logic may translate e.g. a SET TILT=15° command to relative movement of the operating element actuator to perform a corresponding movement of the operating element, thus causing the phase shifting elements to effect a phase shift resulting in the desired down tilt angle.

One such system is previously known from the document EP EP1356539 (Kathrein Werke KG). EP1356539 discloses an antenna control apparatus as well as an associated antenna. The control apparatus has control electronics and an electric motor. The antenna control apparatus is arranged such that it can be retrofitted outside the protective cover of a base station antenna and engage an operating element, which is passed out of the interior of the antenna via an operating opening, or be introduced into the interior of the protective cover via this operating opening. Alternatively, the control apparatus may be fitted as a preferably complete unit underneath the protective cover of the antenna. The possibility of retrofitting a control apparatus is desirable since it makes it possible to modify existing antennas at existing base stations with only manual downtilt possibilities so as to enable remote downtilt control of those antennas.

One problem with both manual and remote downtilt, however, is to achieve an easy and reliable connection of the operating element actuator to the operating element.

AIM AND MOST IMPORTANT FEATURES OF THE INVENTION

It is an object of the present invention to provide an antenna control system for setting the tilt angle of an antenna that solves the above mentioned problem.

This object is achieved by an antenna control system according to the characterizing portion of claim 1.

It is a further object of the present invention to provide an operating element actuator that solves the above mentioned problem.

This object is achieved by an operating element actuator according to the characterizing portion of claim 21.

It is a further object of the present invention to provide an operating element that solves the above mentioned problem.

This object is achieved by an operating element according to the characterizing portion of claim 25.

It is also an object of the present invention to provide an antenna that solves the above mentioned problem.

This object is achieved by an antenna according to the characterizing portion of claim 29.

The antenna control system according to the present invention is characterized in that the operating element actuator is coupled to the operating element of the phase shifting means by means of a force field coupling.

This has the advantage that the operating element actuator can be mounted on an antenna, outside a protective cover of the antenna, without the need of any operating openings in the protective cover, or any physical engagement of the operating element actuator with the operating element.

The force field coupling may be a magnetic field coupling, and the magnetic field coupling may comprise a first magnet connected to the operating element and a second magnet connected to the operating element actuator. The magnets may constitute magnets from any of the group: permanent magnet or electromagnet such as a current coil. This has the advantage that the force field coupling may be established in an easy and cost efficient way.

The operating element actuator may consist of an electric motor with associated control electronics. This has the advantage that the tilt angle of a main beam of an antenna may be electronically controlled.

The electric motor and its associated control electronics may comprise a complete unit or complete module. This has the advantage that the module can be retrofitted to the antenna. As an alternative, said unit or module may be arranged to be mounted within the environmental protection (protective cover) of the antenna. This might be advantageous when the antenna is intended to only be used in connection with remote controlled electrical tilt.

The electric motor and its associated control electronics may be accommodated in a separate housing arranged to be secured to the antenna outside the environmental protection (protective cover) of the antenna. Said housing may be arranged such that it can be retrofitted to the antenna, preferably without opening the environmental protection of the antenna. This has the advantage that the module can be retrofitted to the antenna as a separate unit with an own protective cover separated from the protective cover of the antenna.

The system may comprise means for determining the exact position of the operating element, and thereby the exact angular direction of said main lobe. Said means for determining the exact position of the operating element may include a sensor for sensing slip of the second magnet relative to the first magnet and/or an exact position of the second magnet.

The control electronics may include:
input means for receiving command signals transmitted from a remote control unit,
means for determining if any received command signal is intended for the antenna unit,
means for converting said command signal intended for the antenna unit into a corresponding control signal for said electric motor, and
means for controlling said electric motor based on the control signal in order to displace the operating element so as to make a corresponding adjustment of said phase of said signal at each antenna element, thereby controlling the general angular direction of said main lobe. The means for determining if the command signal is intended for the antenna unit may further include means for reading an address in an address field in the command signal.

This has the advantage that the control electronics may be well suited for use in a communication system utilizing remote setting of the tilt of main beams of antennas in the communication system.

These and other features of the invention will become apparent from the detailed description below.

The invention will be explained more fully below with reference to the appended drawings illustrating exemplary embodiments.

DETAILED DESCRIPTION OF EXEMPLARY EMBODIMENTS

Figure 1:
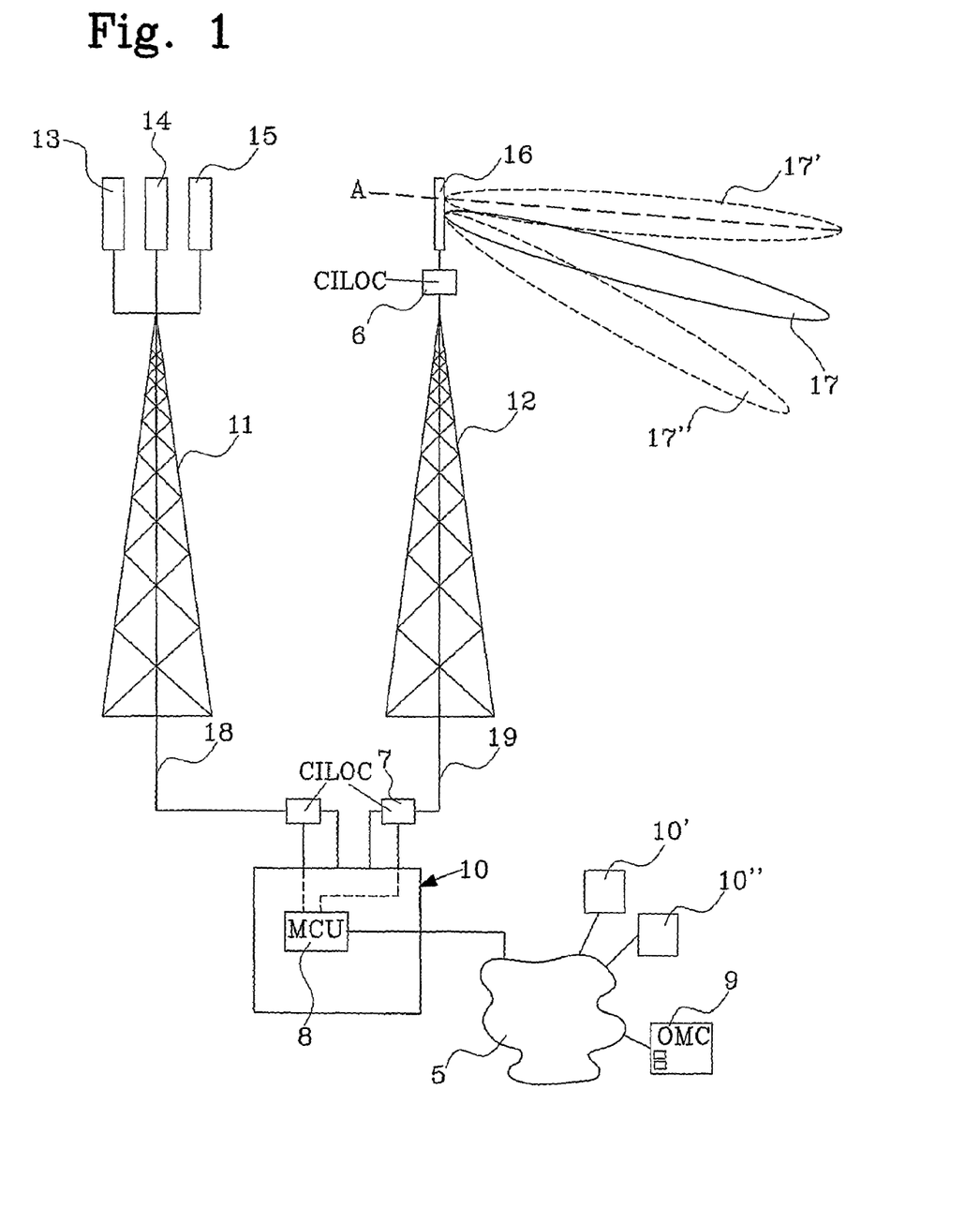
FIG. 1 shows part of a cellular communication system which beneficially may implement the present invention.

In FIG. 1 is shown part of a cellular communication system which beneficially may implement the present invention. The figure shows a base station 10 with two antenna frame structures, such as towers 11, 12. Three antennas 13, 14, 15 are mounted to the tower 11, while only one antenna 16 is mounted to the tower 12. Each antenna 13-16 transmits signals in a main lobe, of which only the main lobe 17 of antenna 16 is shown. In the figure, the main lobe 17 is directed slightly downwards. By use of phase shifting means, the main lobe 17 may, and, of course, in a similar manner main lobes of the antennas 13-15, independently of other main lobes be tilted up or down in a certain angle range relative to a horizontal plane A. This is indicated by upper and lower main beams 17' and 17". The angle range may e.g. be from 0° to 90°. Other angle ranges may, however, of course equally well be utilized.

The antennas are driven via feeder cables, such as coax cables 18 and 19 connecting the antennas to the base station 10, and which are used to provide the antennas with signals to transmit, and to provide the base station with signals received by the antennas.

In a system utilizing remote setting of the tilt of a beam of an antenna, the tilt angle may be set, e.g. from an operation and maintenance centre (OMC) 9, which is connected to a plurality of base stations (indicated as 10', 10"), e.g. via an Ethernet network 5 such as the Internet or a Local Area Network. Alternatively, the OMC 9 may be connected to the base station(s) via e.g. a modem connection. When an OMC operator, or an OMC computer performing automatic supervising of the communication system, decides that the tilt angle of antenna 16 should be altered, a command such as e.g., SET TILT=22° is generated. If the command is generated by an operator, the command may be generated via e.g. a keyboard. Alternatively, the command may be automatically generated by a supervising computer. The generated command is transmitted to a control unit, such as a Master Control Unit (MCU) 8, in the base station. As an alternative, a MCU 8 may be mounted to each tower. If a single MCU 8 located in the base station is used, this MCU may be shared by a plurality of towers. The set tilt command may be transmitted to the MCU via an Ethernet network, e.g. by the TCP/IP protocol.

In the MCU 8, the set tilt command is converted to a format suitable for use by control electronics located near the antenna, and is transmitted to the control electronics, e.g. as a signal superposed on the feed line signals and preferably via the AISG protocol, which is incorporated herein by reference. If the signals are superposed on the feed line signals, this may be accomplished by using a CILOC 7 (Current Injector Layer One Converter) near the base station and a second CILOC 6 near the antenna. Alternatively, the command signals to the antenna unit may be transmitted to the control electronics via a direct link from the MCU 8 to the control electronics. The control signals may further be transmitted to the control electronics via a wireless interface.

Figure 2:
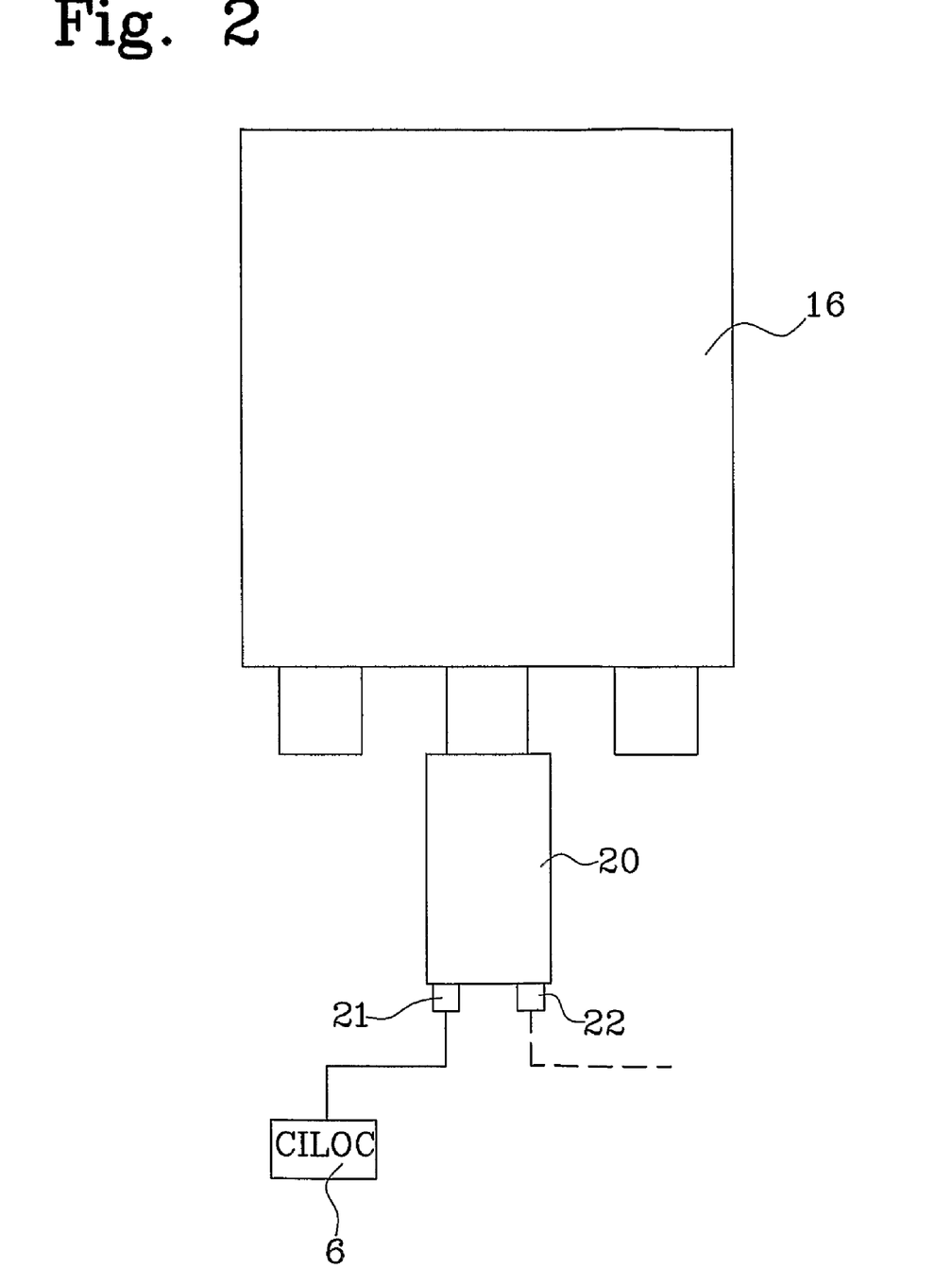
FIG. 2 shows a lower portion of a protective cover of an antenna, and a housing comprising the control electronics.

The operation of the control electronics will be described more in detail with reference to FIGS. 2 and 3. In FIG. 2 is shown the lower portion of the protective cover of the antenna 16 and a housing 20 comprising the control electronics and an electric motor such as a stepping motor. The lower portion of the housing comprises a connection 21 for connecting a cable from the upper, rightmost CILOC 6 in FIG. 1. If more than one antennas are mounted to the tower, such as the antennas 13-15, the housing may comprise a second connection 22 for providing the signals to the control electronics of the other antennas.

Figure 3:
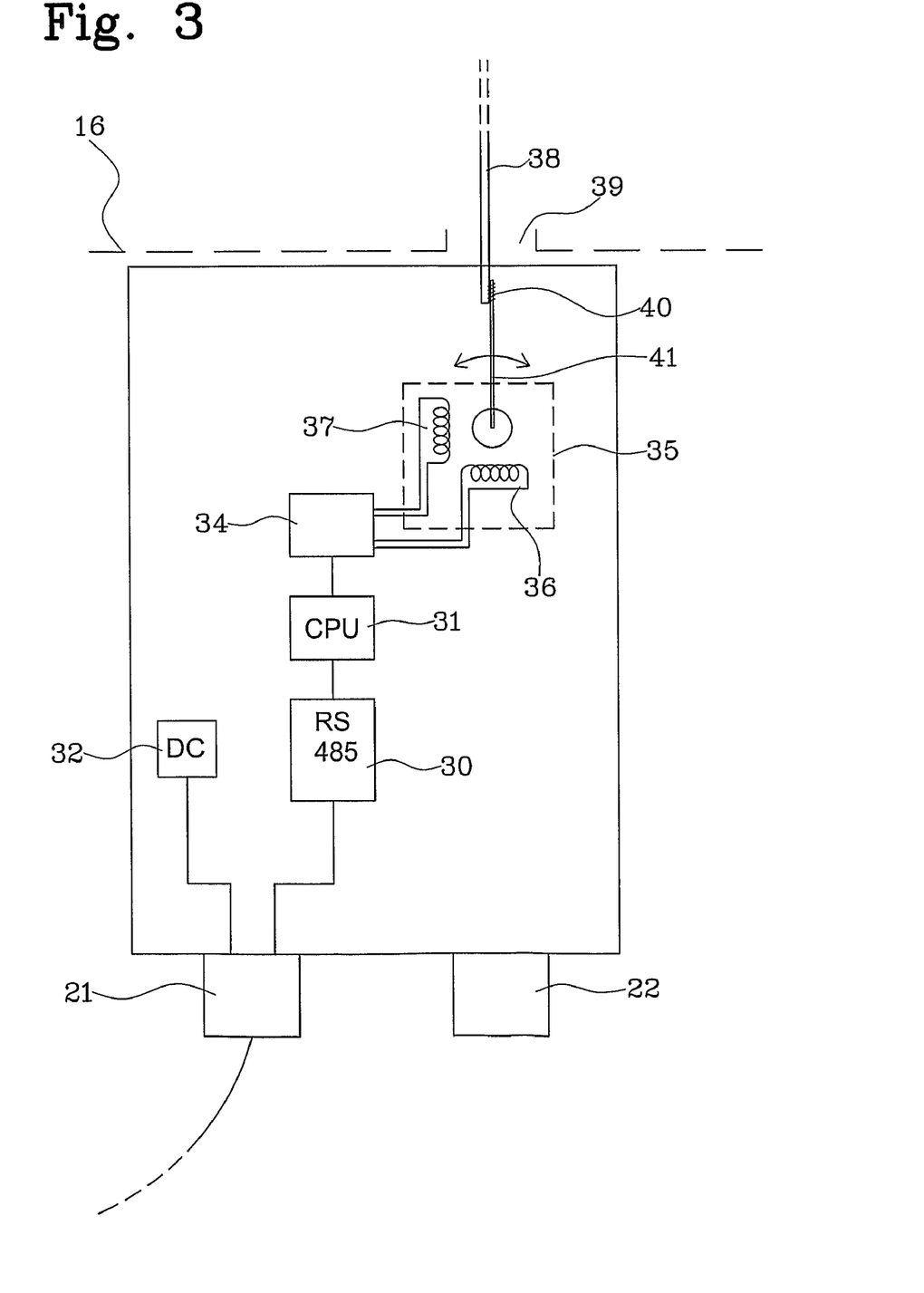
FIG. 3 shows the contents of the housing in FIG. 2 more in detail.

The content of the housing 20 is shown more in detail in FIG. 3. The signal received from the CILOC 6 is used to power the control electronics and the electric motor via a DC module 32. Further, a receiving circuit, such as a RS485 circuit 30 used in the AISG standard, monitors received signals and looks for an address of the antenna. If the receiving circuit 30 determines that a received command is intended for the particular antenna, the command is converted to a CPU readable format and transmitted to the CPU 31 via connection 33. The CPU converts the received command (e.g. the SET TILT=22° command) to drive signals of a stepping motor driver 34, which driver 34 actuates two linings 36, 37 of a stepping motor 35, which in turn actuates an operating element 38 of e.g. phase shifting means for imposing a relative phase shift so that the phase angle differences between any two radiating elements is the same.

In order to translate command signals into drive signals, type of antenna and/or a table including the relationship of lobe inclination vs. unit length of movement of the operating element or steps of the stepping motor, may be stored in a memory in, or connected to, the CPU. The data in this memory may further be replaced by other data, e.g. transmitted to the control electronics from the OMC.

The operating element may be extended through an operational opening 39 in the antenna housing 16, and be provided with teeth for engagement with a threaded portion 40 of a shaft 41 of the stepping motor 35, directly or via a gear coupling (not shown).

As mentioned above, a number of antennas may be provided on the same tower, and each antenna may be provided with a control apparatus as disclosed in FIGS. 2-3 in order to allow individual setting of each antenna. It is, however, also possible that there are a plurality of antennas, e.g. three antennas each covering a 120° sector, or six antennas each covering a 60° sector, which are to be controlled with identical commands. One control apparatus may then be used to control these antennas by controlling a plurality of stepping motors, e.g. by having a stepping motor driver able to provide drive signals to a plurality of stepping motors.

Figure 4A:
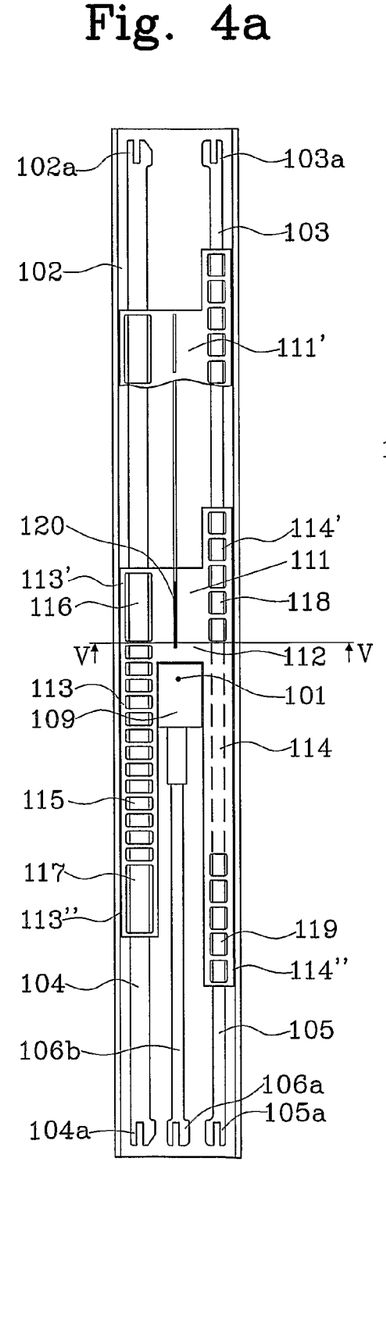
FIGS. 4a and 4b shows phase shifting means suitable for use with the present invention.
Figure 4B:
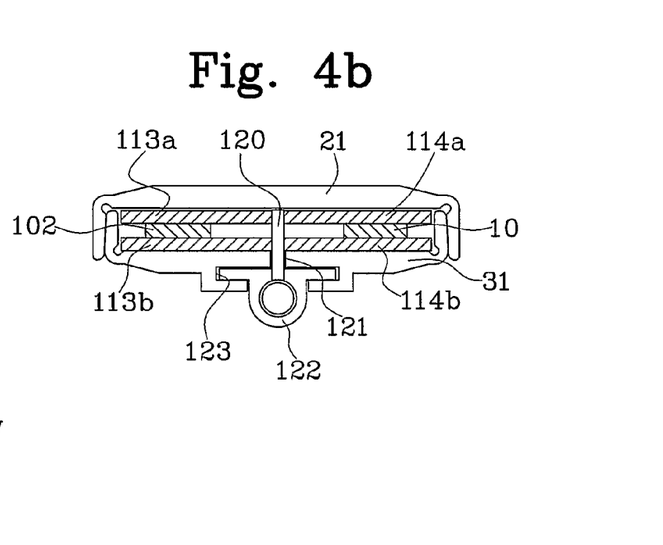

An example of phase shifting means, which can be used with the above described solution, and with the present invention, is shown in FIGS. 4a and 4b. The phase shifter in FIGS. 4a and 4b is explained more in detail in WO02/35651. In the illustrated embodiment is shown phase shifting means for providing phase shift to four radiating elements or sub-arrays, e.g. pairs of antenna elements, arranged in an array, normally a linear row. Each element is connected to a central source connection terminal via an associated feed connection terminal 102a, 103a, 104a and 105a, respectively, and straight line segments 102-105. The source connection terminal 101 is connectable to a signal source by means of a feed conductor 106, which is connected to a feed terminal 106a. In use, the feed terminal 106a is connected, e.g. via a coaxial cable, to transceiver circuits (not shown), e.g. included in the base station In order to achieve phase shifting, a displaceable dielectric body is used, as will be explained below.

A microwave signal appearing at the feed terminal 106a will propagate along the central feed conductor 106 to the centrally located source connection terminal 101. Adjacent to the terminal 101, there are upper and lower stationary dielectric elements 109, 110, aiding impedance matching of the four feed line segments 102-105. A unitary body 111 of dielectric material is arranged between the housing walls and the feed line segments 102, 103, 104, 105 so as to influence the propagation velocity and the phase shift of the signal components being transferred along the respective line segments. The dielectric body 111 is linearly displaceable along the longitudinal direction A between two end positions, one of which is the fully drawn position in FIG. 4a and the other being the one indicated by dashed lines 111'.

The dielectric body 111 includes two longitudinal side portions connected by a transverse body portion 112, namely a first body portion 113 and a second body portion 114.

The phase angle differences between the signal components at the feed connection terminals 102a, 103a, 104a, 105a will depend on the particular position of the dielectric body 111. When the dielectric body 111 is displaced a certain distance, all the phase shifts of the four signal components will be changed uniformly. Accordingly, the phase angle difference between the terminals associated with adjacent antenna elements (or sub-arrays) will always be mutually the same. Thus, the phase angle differences between the terminals 103a and 102a, between the terminals 102a and 104a, and between the terminals 104a and 105a will be equal to each other. Therefore, the composite beam from the four antenna elements coupled to these terminals will always have a wave front substantially in the form of a straight line, and the inclination of this wave front can be adjusted by displacing the dielectric body 111 to a different position in the longitudinal direction of the device.

As can be seen in FIG. 4b, a movement transfer member 120 is secured to the dielectric body 111 and extends through a longitudinal slot 121 in the bottom wall 31 of the housing 10. The member 120 is connected to a slide member 122, which is longitudinally guided in profiled grooves 123 formed at the lower side of the bottom wall 31. This slide member 122 may constitute, or be connected to, the operating element, whereupon the inclinational angle of the beam from the antenna can be adjusted as desired by operating the operating element.

A problem with this solution, however, is, as mentioned above, to achieve an easy and reliable connection of the operating element actuator to the operating element. A further problem is the need of an opening in the protective cover of the antenna for allowing connection of the operating element actuator to the operating element.

Figure 5:
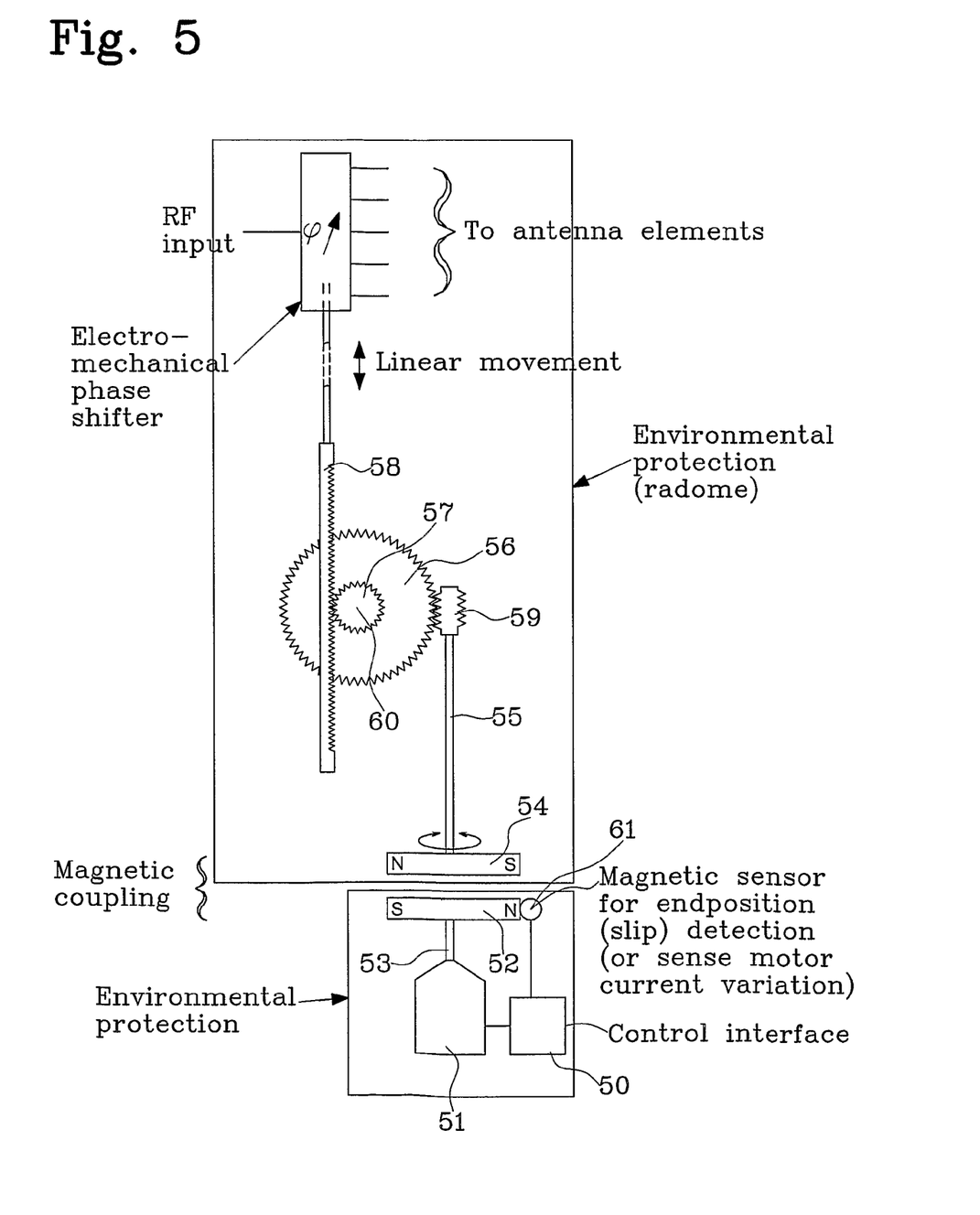
FIG. 5 shows an embodiment of a system according to the present invention.

In FIG. 5 is shown a system according to the present invention in which the need of an opening in the protective cover is eliminated. The operation of the system in FIG. 5 is identical to the operation of the system in FIGS. 2-3 from the OMC to the operation of the stepping motor. When the control electronics 50 have received a command requesting a change of antenna beam tilt, the command is translated into stepping motor 51 drive signals as described above. Rotation of the stepping motor 51 causes a first bar permanent magnet 52, which is rigidly attached to the shaft 53 of the stepping motor 51, to rotate. Rotation of the first bar permanent magnet 52 causes a second bar permanent magnet 54 to rotate with the first magnet 52. This rotation is accomplished by the magnetic force field coupling between the two permanent magnets 52, 54, which at all times will strive to keep the magnets in the position shown in the figure, where the north pole of the second magnet is located right above the south pole of the first magnet, and the south pole of the second magnet is located right above the north pole of the first magnet. There is thus a magnetic coupling between the second magnet 54 and the first magnet 52. The second magnet is further rigidly attached to a first end of a second shaft 55, which thus will be brought into rotation when the second magnet is brought into rotation by the first magnet. The other end of the second shaft 55 comprises a threaded portion 59, which engages a first pinion

56, mounted on a third shaft 60. The pinion 56 may engage the operating element 58 (e.g., constituting, or being connected to, the slide member 122 in FIG. 4*b*) directly, or, alternatively, as is shown in the figure, the threaded portion engages the operating element 58 via a second pinion 57, also mounted on the shaft 60 and connected so as to rotate with the first pinion 56. The second alternative has the advantage that the gear allows that a lower torque has to be transferred via the magnetic coupling, thus reducing the risk of magnetic slip between the first and the second magnet. In order to ensure that a correct tilt angle is set, the system may comprise means for detecting slip. This may be accomplished a magnetic sensor 61 that detects the end position of the magnets by detecting the magnetic field and determine the position of the magnets relative to each other there from. The magnetic sensor 61 may also be used to determine number of revolutions of the stepping motor.

Figure 6:
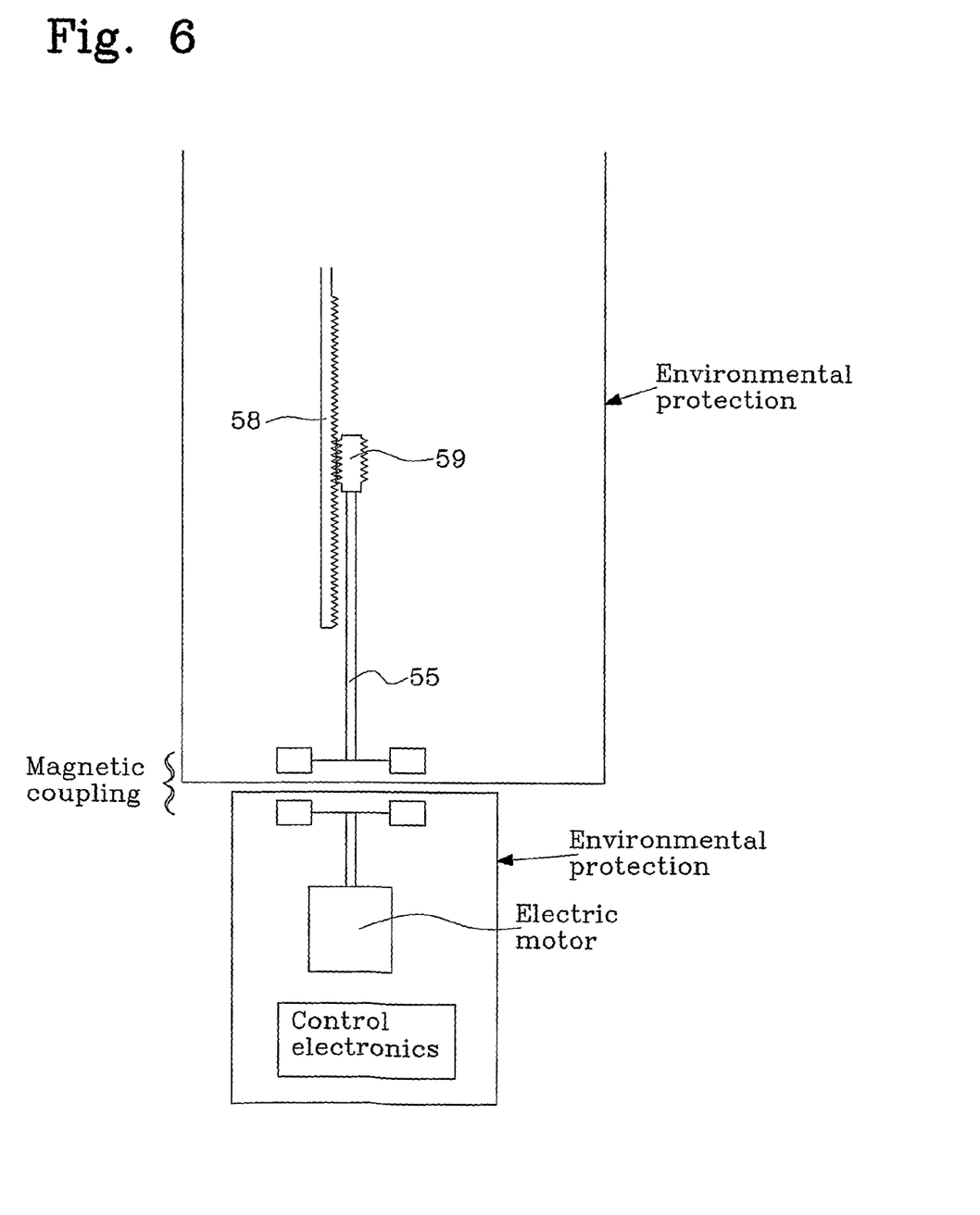
FIG. 6 shows an alternative embodiment of a system according to the present invention.

In FIG. 6 is shown an alternative embodiment of the linkage between the operating element 58 and the second shaft 55. In this embodiment, the threaded portion 59 of the second shaft 55 engages the operating element directly, without the pinion transmission linkage. As compared to the embodiment in FIG. 5, this embodiment increases the risk of magnetic slip since a larger torque has to be transferred by means of the magnetic coupling. This disadvantage may, however, be mitigated by rotating the first magnet at a lower speed, thus reducing the slip risk. This embodiment further has the advantage that it eliminates the need of pinions completely. The magnetic sensor works in the same way as in FIG. 5.

Figure 7:
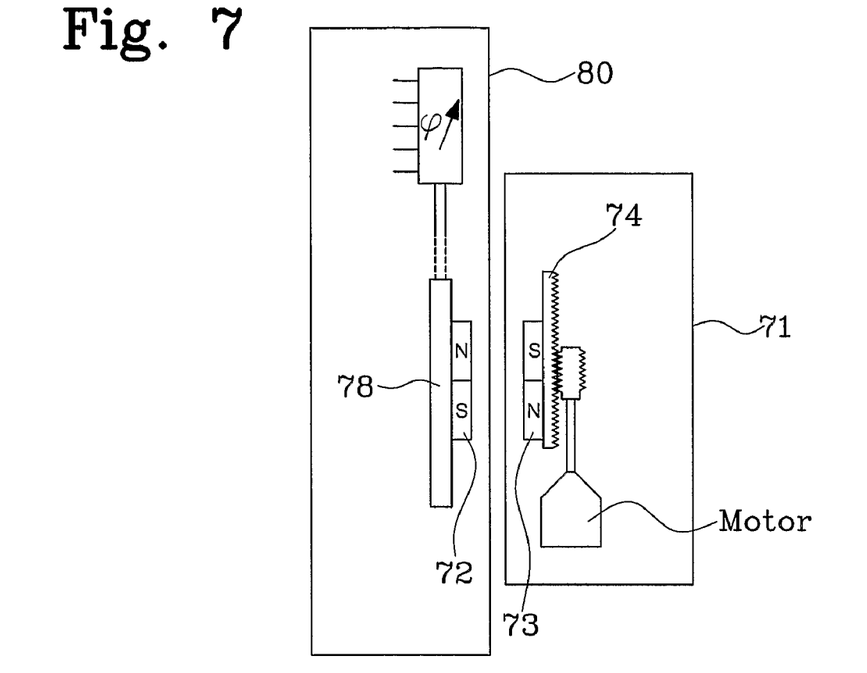
FIG. 7 shows another embodiment of a system according to the present invention.

In FIG. 7 is shown yet another embodiment. Instead of having the control apparatus and its associated environmental protection 71 mounted along an axis in the longitudinal direction of the operating element 78, the control apparatus and its associated environmental protection 71 is now attached to the environmental protection 80 of the antenna substantially parallel to the operating element 78. In this embodiment, the operating element need not be provided with a toothing, instead, a bar permanent magnet 72 is secured to the operating element 78. Alternatively, the magnet may constitute part of the operating element. Inside the environmental protection of the control electronics, another bar permanent magnet 73 is attached to a linearly movable slide 74, which is movable in the same way the operating element in FIG. 5 or 6. Thus, in this embodiment, the magnets are used to transfer a linear movement instead of a rotational movement. This embodiment has the advantage that no pinions or other rotating means are required inside the environmental protection of the antenna, which thus results in a reduced risk of failure inside the antenna. Further, the slip risk is reduced, and the tilt angle can be determined by measuring the position of the slide 74.

Common to all embodiments disclosed above, is that the respective magnets should be arranged as close as possible to the respective environmental protections in order to obtain an as strong as possible magnetic field strength.

Figure 8:
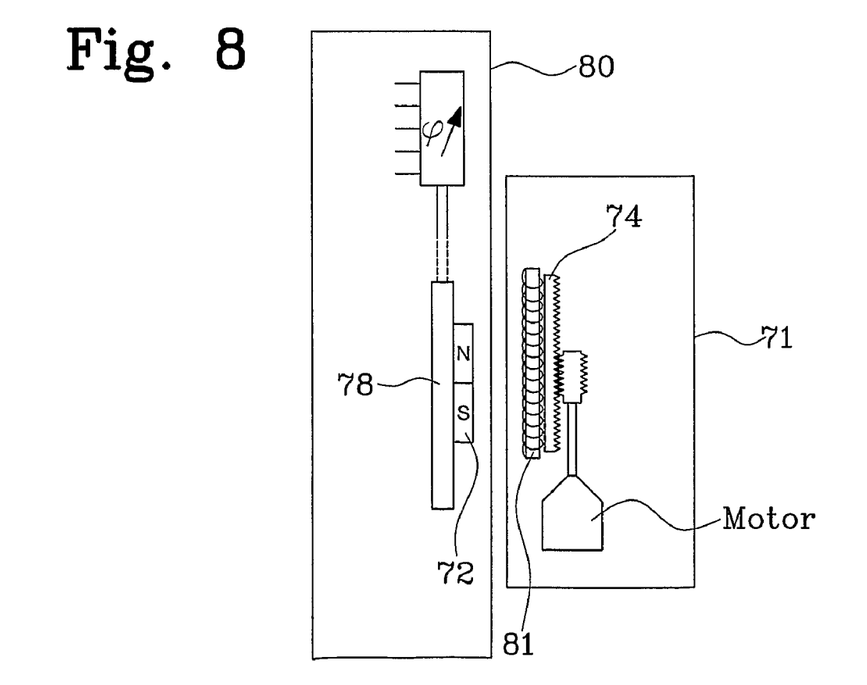
FIG. 8 shows an alternative embodiment of a force field coupling according to the present invention.

In the above description the force field coupling has been described in connection of permanent magnets. It is, of course, also possible to replace either or both magnets with an electromagnet such as a current coil. As a person skilled in the art would appreciate, a current coil may provide the same magnetic field as a permanent magnet, however with the advantage that the strength of the field may be varied, e.g. the field strength may be increased if an increased occurrence of slip is detected, e.g. due to biting or wear of parts. An example of a current coil solution is shown in FIG. 8 where the permanent magnet in FIG. 7 is replaced with a current coil 81.

The present invention thus presents a solution that allows remote control of an operating element to control the antenna down tilt without a physical connection between the operating element and the operating element actuator. The present invention further has the advantage that the control equipment can be attached to the antenna housing in any suitable way, and allowing retrofitting control equipment to an existing antenna without the need to remove the antenna protective cover or need of an opening in the antenna cover for making connection of an operating element actuator to an operating element possible.

In the above description, the force field coupling has been described in connection with electric control of the operating element via a stepping motor. The antenna may, however, at time of distribution be provided with means for manual control only of the down tilt. In such a solution, the stepping motor in FIG. 5 would be replaced by a rotatable knob, preferably arranged on the outside of the environmental protection of the control equipment (in this case, no control equipment would be present, the environmental protection would thus merely include a magnet and a shaft on which the magnet and knob is attached. This would allow downtilt angle adjustment by rotating the knob. If the mobile telephone system operator at a later stage would decide to modify antenna control so as to allow remote control of antenna downtilt, the module with the knob can simply be removed and replaced by the module of FIG. 5, which thus allows quick and easy conversion from manual electrical downtilt to remote electrical downtilt without any effect on the antenna. If a solution such as the one described with reference to FIG. 7 is used, the rotatable knob would be replaced by means for linearly displacing the slide 74.

In the above description, the control system has been described in connection with particular phase shifting means. It is to be understood, however, that the present invention equally well may be used with any other type of phase shifting means that is suitable for operation by means of an operating element. Further, in the above description a stepping motor has been used. It is, of course, also possible to use other types of electric motors or other types of equipment that can perform a desired actuation of the operating element.

The invention claimed is:

1. An antenna control system for setting the tilt angle of a main lobe of an antenna, in particular of an antenna constituting part of a base station in a mobile cellular communication system, said antenna comprising a plurality of antenna elements and phase shifting means for varying the phase of at least one signal being fed to said antenna elements, wherein adjustment of said phase of said signal is achieved by actuating an operating element, and wherein actuation of said operating element is achieved by operating an operating element actuator, wherein the operating element actuator is coupled to the operating element of the phase shifting means by means of a force field coupling.

2. Antenna control system according to claim 1, wherein said force field coupling is a magnetic field coupling.

3. Antenna control system according to claim 2, wherein said magnetic coupling comprises a first magnet connected to the operating element and a second magnet connected to the operating element actuator.

4. Antenna control system according to claim 3, wherein said magnets are magnets from any of the group: permanent magnet or electromagnet.

5. Antenna control system according to claim 1, wherein the operating element actuator consists of an electric motor with associated control electronics.

6. Antenna control system according to claim 5, wherein the electric motor and its associated control electronics comprise a complete unit or complete module.

7. Antenna control system according to claim 6, wherein said unit or module is arranged to be mounted within the environmental protection (protective cover) of the antenna.

8. Antenna control system according to claim 5, wherein the electric motor and its associated control electronics is accommodated in a separate housing arranged to be secured to the antenna outside a protective cover of the antenna.

9. Antenna control system according to claim 8, wherein said housing can be retrofitted to the antenna, preferably without opening the protective cover of the antenna.

10. Antenna control system according to claim 5, wherein a first magnet is provided on a shaft of the electric motor, and that a second magnet, operatively coupled to the first magnet, is connected to a threaded portion which interacts with a pinion, which in turn is operatively coupled to the operating element such that rotational movement of the first magnet is translated to linear movement of the operating element.

11. Antenna control system according to claim 5, wherein the control electronics include:
input means for receiving command signals transmitted from a remote control unit,
means for determining if any received command signal is intended for the antenna unit,
means for converting said command signal intended for the antenna unit into a corresponding control signal for said electric motor, and means for controlling said electric motor based on the control signal in order to displace the operating element so as to make a corresponding adjustment of said phase of said signal at each antenna element, thereby controlling the general angular direction of said main lobe.

12. Antenna control system according to claim 11, wherein the means for determining if the command signal is intended for the antenna unit includes means for reading an address in an address field in the command signal.

13. Antenna control system according to claim 11, wherein a base station control unit (master control unit) is located at the base station and/or a frame structure carrying the antenna, which base station control unit receives command signals from an operations control centre at a location remote from said base station and transmits the command signals to at least one antenna unit.

14. Antenna control system according to claim 13, wherein the base station control unit transmits the command signals to the antenna unit via a direct link or superposed on the antenna feed line(s).

15. Antenna control system according to claim 5, wherein the control electronics further includes a memory arranged to store type of antenna and/or a table including the relationship of lobe inclination vs. unit length of movement of the operating element.

16. Antenna control system according to claim 1, wherein the system comprises means for determining the exact position of the operating element, and thereby the exact angular direction of said main lobe.

17. Antenna control system according to claim 16, wherein said means for determining the exact position of the operating element includes a sensor for sensing slip of the second magnet relative to the first magnet and/or an exact position of the second magnet.

18. Antenna control system according to claim 1, wherein the antenna elements are coupled by fixed transmission lines to a central feeding point for said signal.

19. Antenna control system according to claim 18, wherein the operating element is a linearly movable slide with dielectric body portions for influencing the signal velocity along said fixed transmission lines.

20. Antenna control system according to claim 1, wherein the communication system is any from the group:
GSM system, UMTS system, AMPS system, a TDMA and/or CDMA and/or FDMA system.

21. Operating element actuator, for use in a system for setting the tilt angle of a main lobe of an antenna, in particular of an antenna constituting part of a base station in a mobile cellular communication system, said antenna comprising a plurality of antenna elements and phase shifting means for varying the phase of at least one signal being fed to said antenna elements, wherein adjustment of said phase of said signal is achieved by actuating an operating element, and wherein actuation of said operating element is achieved by operating the operating element actuator, wherein the operating element actuator comprises means for coupling to the operating element of the phase shifting means by means of a force field coupling.

22. Operating element actuator according to claim 21, wherein said force field coupling is a magnetic field coupling.

23. Operating element actuator according to claim 21, wherein said means for coupling comprises a magnet.

24. Operating element actuator according to claim 23, wherein said magnet is a magnet from any of the group: permanent magnet or electromagnet.

25. Operating element, for use with phase shifting means in a system for setting the tilt angle of a main lobe of an antenna, in particular of an antenna constituting part of a base station in a mobile cellular communication system, said antenna comprising a plurality of antenna elements and phase shifting means for varying the phase of at least one signal being fed to said antenna elements, wherein adjustment of said phase of said signal is achieved by actuating the operating element, and wherein actuation of said operating element is achieved by operating an operating element actuator, wherein the operating element comprises means for coupling to the operating element actuator by means of a force field coupling.

26. Operating element according to claim 25, wherein said force field coupling is magnetic field coupling.

27. Operating element according to claim 25, wherein said means for coupling comprises a magnet.

28. Operating element according to claim 27, wherein said magnet is a magnet from any of the group: permanent magnet or electromagnet.

29. Antenna, in particular an antenna constituting part of a base station in a mobile cellular communication system, said antenna comprising a plurality of antenna elements and phase shifting means for varying the phase of at least one signal being fed to said antenna elements, wherein adjustment of said phase of said signal is achieved by actuating an operating element, and wherein actuation of said operating element is achieved by operating an operating element actuator, wherein the operating element comprises means for coupling to the operating element actuator by means of a force field coupling.

* * * * *